(12) United States Patent
Baddoo

(10) Patent No.: US 10,143,913 B2
(45) Date of Patent: Dec. 4, 2018

(54) ELECTRONIC MULTIMEDIA PUZZLE

(71) Applicant: Polytangle IP Limited, London (GB)

(72) Inventor: Geoffrey James Akwei Baddoo, London (GB)

(73) Assignee: POLYTANGLE IP LIMITED, London (GB)

(*) Notice: Subject to any disclaimer, the term of this patent is extended or adjusted under 35 U.S.C. 154(b) by 315 days.

(21) Appl. No.: 14/931,767

(22) Filed: Nov. 3, 2015

(65) Prior Publication Data

US 2017/0120141 A1    May 4, 2017

(51) Int. Cl.
| | |
|---|---|
| A63F 9/00 | (2006.01) |
| A63F 9/06 | (2006.01) |
| G09B 5/06 | (2006.01) |
| A63F 13/80 | (2014.01) |
| A63F 13/00 | (2014.01) |
| A63F 13/67 | (2014.01) |
| A63F 13/352 | (2014.01) |

(52) U.S. Cl.
CPC .......... *A63F 9/0612* (2013.01); *A63F 13/00* (2013.01); *A63F 13/352* (2014.09); *A63F 13/67* (2014.09); *A63F 13/80* (2014.09); *G09B 5/06* (2013.01)

(58) Field of Classification Search
CPC .............. A63F 13/80; A63F 2300/69; A63F 2300/8047; G10H 2220/141; G09B 5/06
See application file for complete search history.

(56) References Cited

U.S. PATENT DOCUMENTS

| | | | |
|---|---|---|---|
| 5,643,084 A | 7/1997 | Mirsky | |
| 6,264,198 B1* | 7/2001 | Stamper | A63F 9/10 273/153 R |
| 6,589,116 B1 | 7/2003 | Grigoriev et al. | |
| 6,756,534 B2 | 6/2004 | Gimpelson et al. | |
| 8,771,048 B2 | 7/2014 | Wayans et al. | |
| 8,926,417 B1* | 1/2015 | Pulido | A63F 13/00 463/9 |
| 9,561,431 B1* | 2/2017 | Pulido | A63F 9/0612 |
| 2002/0098891 A1* | 7/2002 | Graham | A63F 13/12 463/42 |
| 2002/0183112 A1* | 12/2002 | Emmerson | A63F 13/005 463/41 |
| 2006/0046813 A1* | 3/2006 | Beyer | A63F 3/0421 463/9 |
| 2011/0148040 A1* | 6/2011 | Bianco | A63F 9/10 273/157 R |
| 2012/0122066 A1* | 5/2012 | Dohring | G09B 5/06 434/308 |
| 2012/0329540 A1* | 12/2012 | Wayans | A63F 9/0612 463/9 |

(Continued)

*Primary Examiner* — Lawrence Galka
(74) *Attorney, Agent, or Firm* — Galvin Patent Law LLC; Brian R. Galvin

(57) ABSTRACT

A system for operating an interactive electronic multimedia puzzle, comprising a puzzle generation engine that receives a variety of audio, video, still graphic, or text-based content, divides content into portions, associates portions of content with puzzle tiles, and presents a puzzle comprising a shuffled arrangement of puzzle tiles to a user, and a method for operating an electronic multimedia puzzle with options which allow both cooperative and competitive social interaction between a plurality of puzzle-solving participants.

20 Claims, 16 Drawing Sheets

(56) References Cited

U.S. PATENT DOCUMENTS

| | | | | |
|---|---|---|---|---|
| 2015/0224403 A1* | 8/2015 | Hisaoka | ................ | A63F 13/537 |
| | | | | 463/29 |
| 2015/0352435 A1* | 12/2015 | Imai | ................... | A63F 13/2145 |
| | | | | 463/9 |
| 2016/0158651 A1* | 6/2016 | Myres | .................... | A63F 13/35 |
| | | | | 463/9 |

* cited by examiner

ELECTRONIC MULTIMEDIA PUZZLE

CROSS-REFERENCE TO RELATED APPLICATIONS

This application is related to co-pending United Kingdom patent application serial number GB 1519428.5, titled "ELETRONIC MULTIMEDIA PUZZLE" and filed on Nov. 3, 2015, the same day as the instant application.

BACKGROUND OF THE INVENTION

Field of the Art

The disclosure relates to the field of games and entertainment, educational tools, training devices and apparatus, and more particularly to the field of puzzle-based games for recreation and education.

Discussion of the State of the Art

Many people enjoy doing puzzles as a leisure activity. Puzzles come in various forms: jigsaws where shapes and patterns must be matched, crosswords that require a combination of knowledge and words, mathematical puzzles such as Sudoku and 3D puzzles such as the Rubik's cube. As technology has improved and mobile computing devices such as smartphones have become commonplace, the use of electronic puzzles has increased, along with it the use of novel features and elements unique to electronic media.

In the art, there exist puzzles utilizing audio content, for example U.S. Pat. No. 6,756,534, hereinafter referred to as "Gimpelson", and U.S. Pat. No. 6,589,116, hereinafter referred to as "Grigoriev", and U.S. Pat. No. 8,926,417, hereinafter referred to as "Pulido". Gimpelson teaches a puzzle wherein a user is presented with a complex audio clip such as a classical music composition, with different instruments separated as individual audio tracks that must be reassembled as pieces of the puzzle to complete the recording, with modified or additional tracks added to increase complexity (a user must discern not only the arrangement of tracks, but also must remove any tracks not present in the original recording or that have been edited). Grigoriev teaches a puzzle wherein an audio clip is divided into time-based portions, and a user must rearrange the portions to complete the full audio recording. Pulido teaches a puzzle wherein both audio and visual elements are divided into portions and associated with puzzle pieces, such that a user must rearrange the pieces to complete both an audio recording and a photograph or other visual object. However, none of these three puzzles teaches the use of additional video or text-based media, nor do they teach the additional obfuscation of media to modify difficulty or any form of social interaction between users.

Other puzzles exist which utilize video content, for example U.S. Pat. No. 8,771,048, hereinafter referred to as "Wayans", and U.S. Pat. No. 5,643,084, hereinafter referred to as "Mirsky". Wayans teaches a puzzle wherein a video clip is divided into a number of time-based segments and a user must rearrange puzzle pieces to complete the video clip, optionally by either arranging video segments directly or by arranging placeholder icons, or by arranging the video and audio segments of a video clip individually. Mirsky teaches a puzzle wherein a video clip is divided based on portions of a video frame, with a user rearranging the puzzle pieces to restore the video frame and view the completed video. Neither of these references teaches the use of additional text-based content, or any additional obfuscation of media to modify the difficulty of a puzzle, or any form of social interaction between users.

What is needed is an electronic multimedia puzzle that utilizes portions of audio, graphics such as still images, photographic or graphic designs, video, and text-based content to produce a puzzle, that is operable to obfuscate some or all of the puzzle pieces to modify difficulty of a puzzle, and which encourages interaction between users with social gaming features and rewards.

OBJECT TO THE INVENTION

The present invention seeks to provide an improved training device. In particular, the present invention seeks to provide an electronic training device or puzzle that utilizes portions of audio, photographic, video, images, graphics and text-based content to produce a training device or puzzle, that is operable to obfuscate some or all of the puzzle pieces. The present invention seeks to provide a training aid or puzzle that can modify a level of difficulty of a puzzle, and encourage interaction between users with educational, social and gaming features and rewards.

SUMMARY OF THE INVENTION

Accordingly, the inventor has conceived and reduced to practice, in a preferred embodiment of the invention, an electronic multimedia puzzle that creates an interactive puzzle using split segments of text, audio, or visual elements, encourages social interaction and rewards, and optionally obfuscates some or all of the puzzle pieces to modify the difficulty.

According to a preferred embodiment of the invention, a system for operating an interactive electronic multimedia puzzle, comprising a puzzle generation engine comprising at least a plurality of programming instructions stored in a memory and operating on a processor of a computing device and configured to load a plurality of multimedia content from a plurality of content sources, and configured to divide at least a portion of the multimedia content into a plurality of segments, and configured to associate at least a portion of the plurality of content segments with at least a portion of a plurality of puzzle tiles, and configured to present at least a portion of the plurality of puzzle tiles for interaction by a human user, and configured to receive a plurality of user interaction, and configured to direct a rearrangement of puzzle tiles for presentation to a user, the rearrangement being based at least in part on at least a portion of the user interaction, is disclosed.

In another preferred embodiment of the invention, a method for operating an interactive electronic multimedia puzzle, comprising the steps of loading, at a puzzle generation engine comprising at least a plurality of programming instructions stored in a memory and operating on a processor of a computing device and configured to load a plurality of multimedia content from a plurality of content sources, and configured to divide at least a portion of the multimedia content into a plurality of segments, and configured to associate at least a portion of the plurality of content segments with at least a portion of a plurality of puzzle tiles, and configured to present at least a portion of the plurality of puzzle tiles for interaction by a human user, and configured to receive a plurality of user interaction, and configured to direct a rearrangement of puzzle tiles for presentation to a user, the rearrangement being based at least in part on at least a portion of the user interaction, a plurality of multimedia content; dividing at least a portion of the loaded content into a plurality of content segments; associating at least a portion of the content segments with a plurality of puzzle tiles; arranging at least a portion of the plurality of puzzle tiles; and presenting at least a portion of the arranged tiles to a human user, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
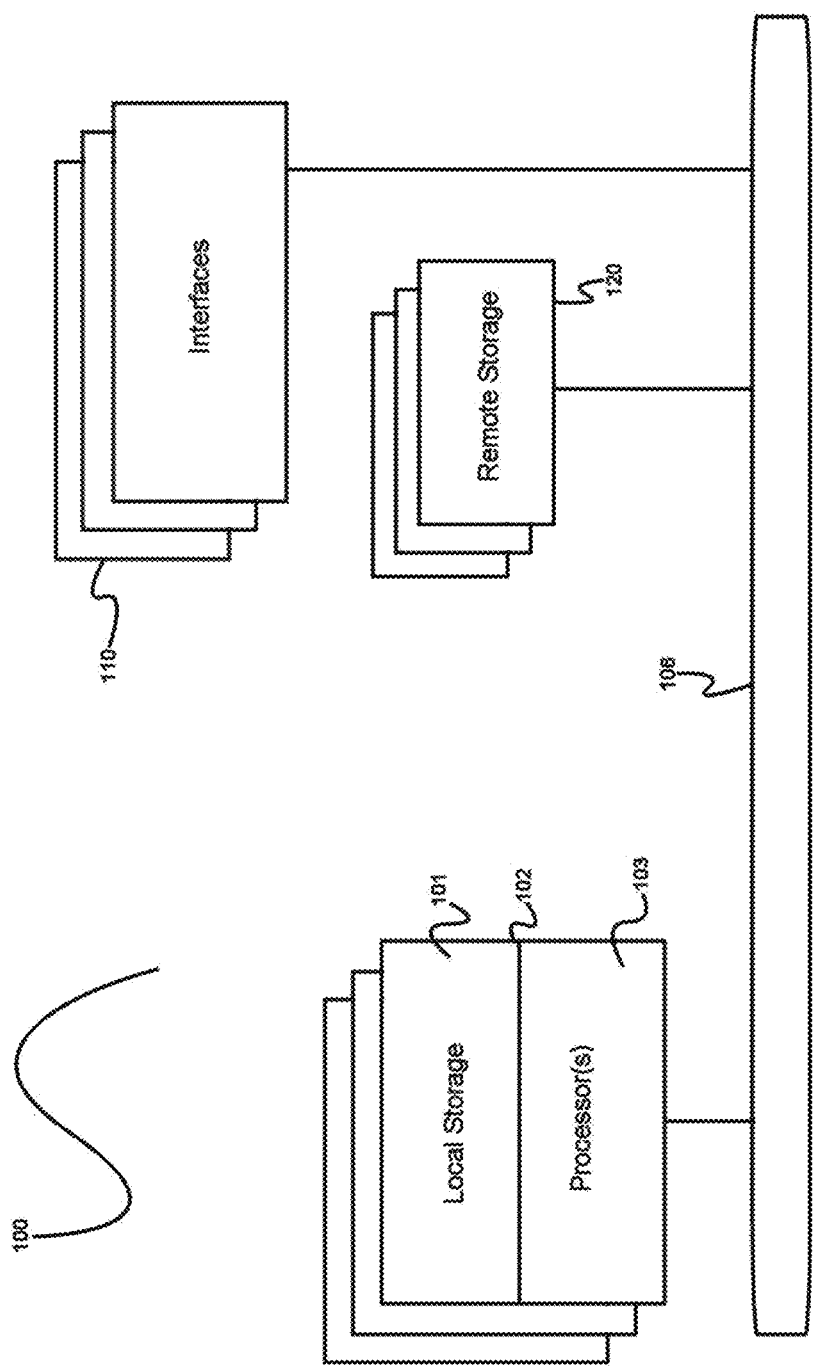
FIG. 1 is a block diagram illustrating an exemplary hardware architecture of a computing device used in an embodiment of the invention.

The inventor has conceived, and reduced to practice, in a preferred embodiment of the invention, an electronic multimedia puzzle that creates an interactive puzzle, such as a training aid, using split segments of text, audio, or visual elements, encourages social interaction, can be configured to provide rewards, and optionally obfuscates some or all of the puzzle pieces to modify the difficulty.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
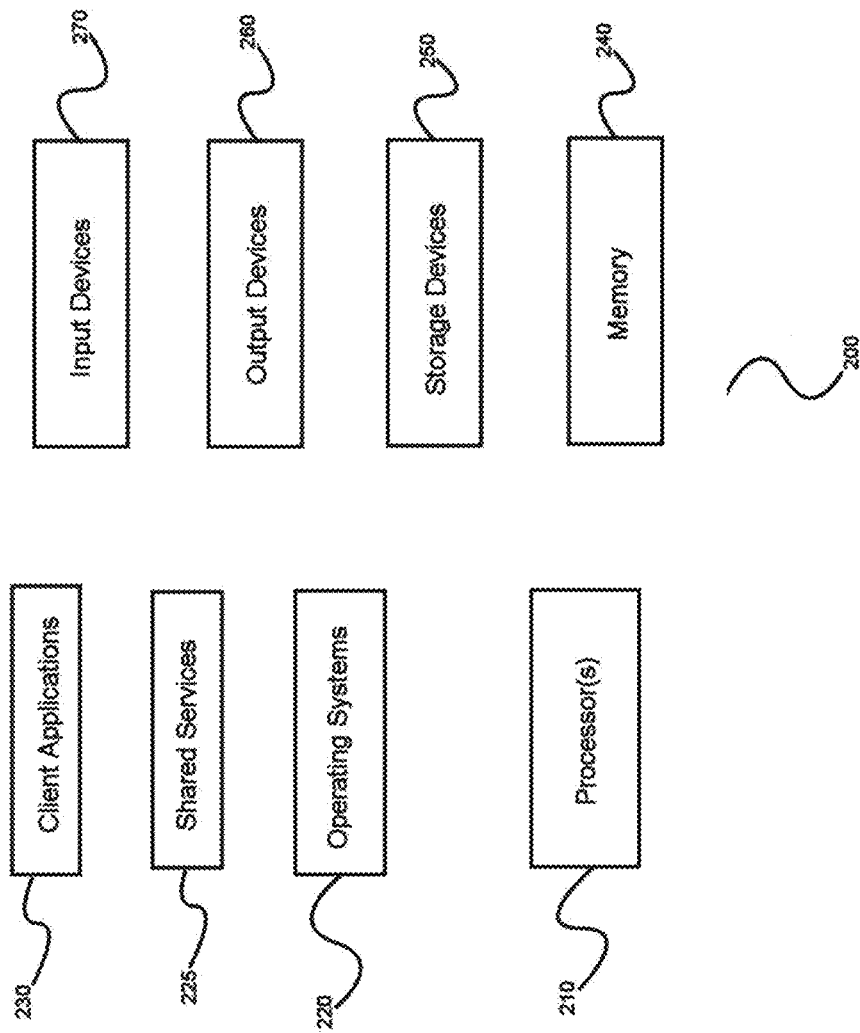
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
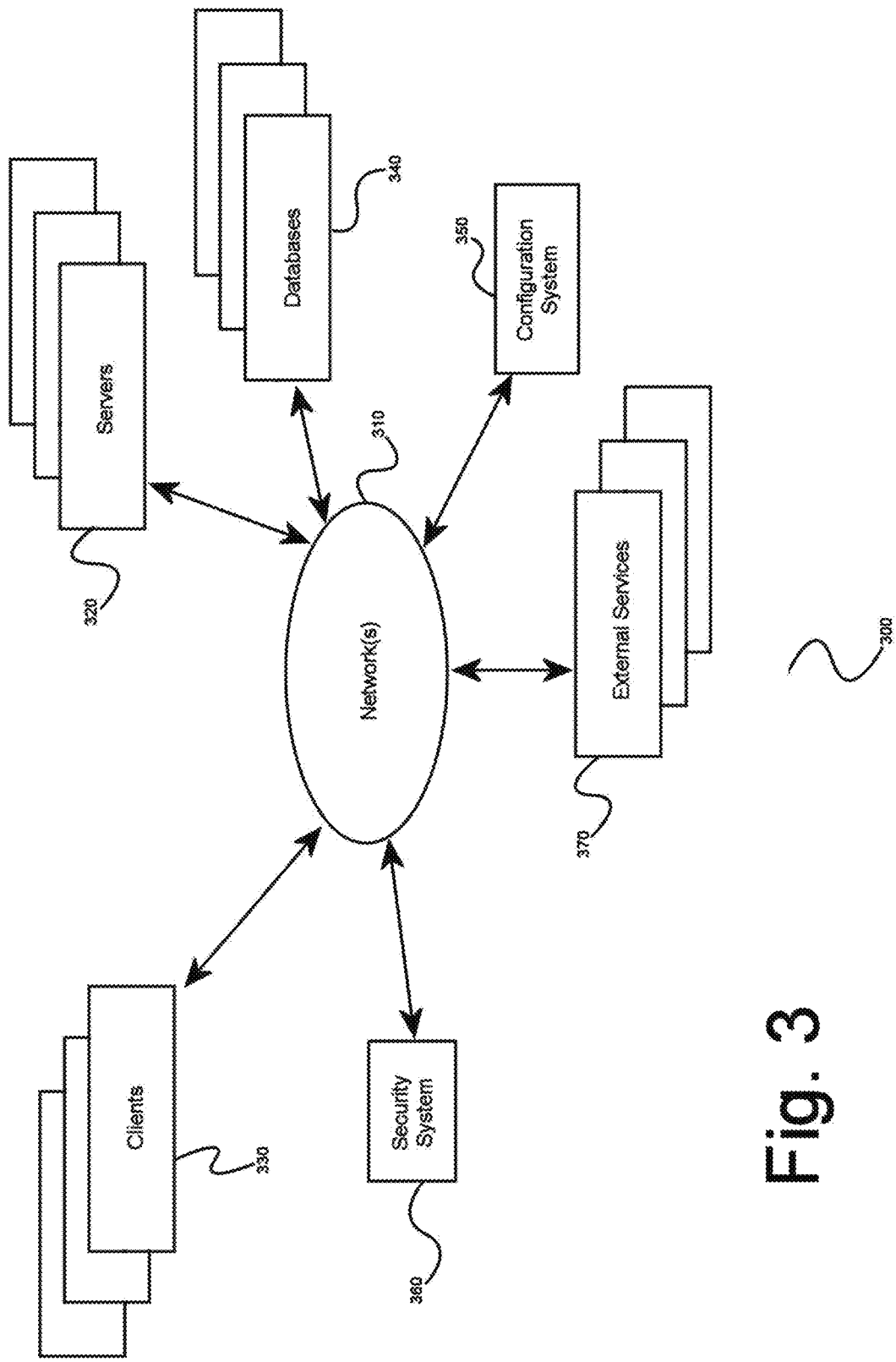
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
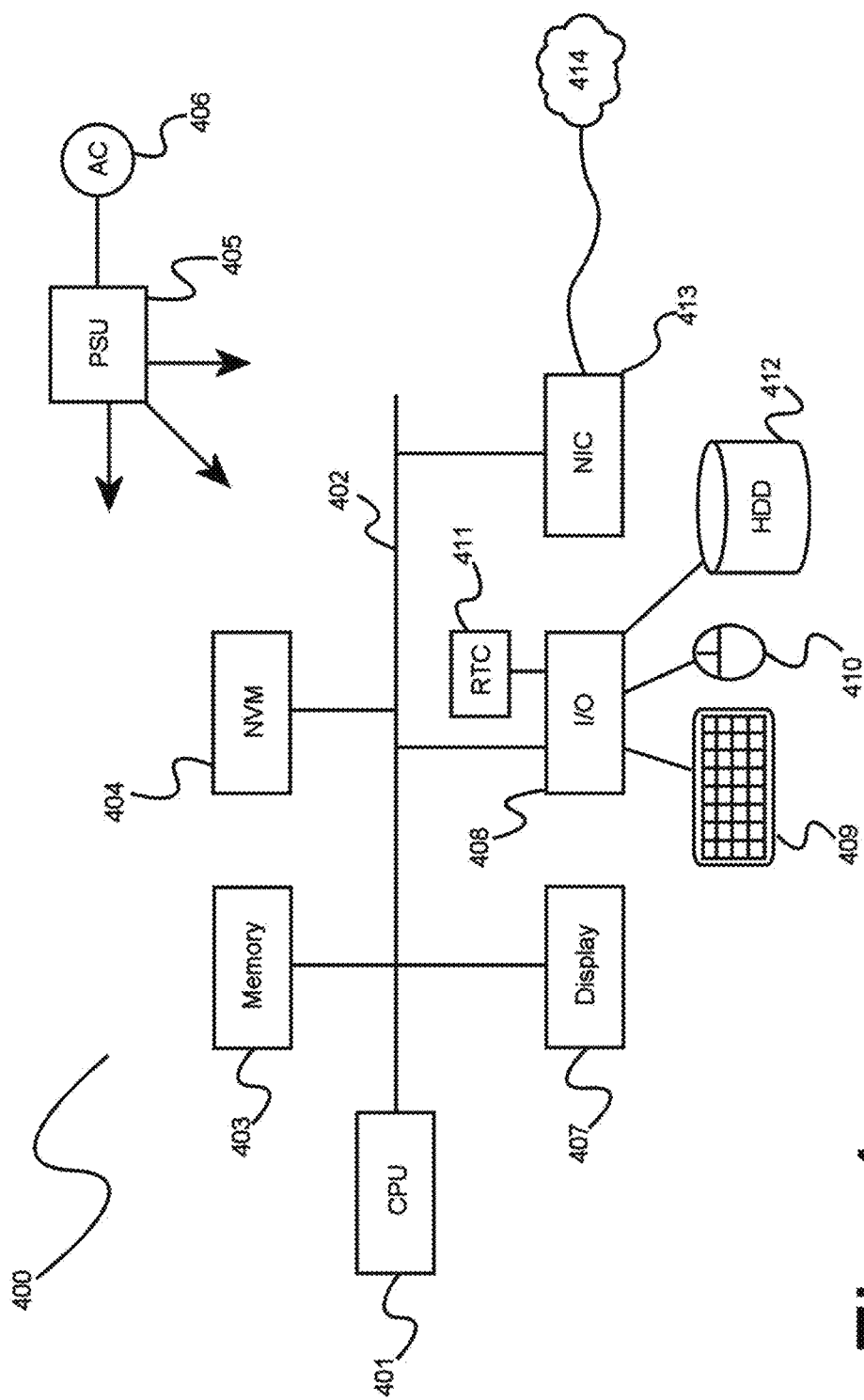
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. Central processor unit (CPU) 401 is connected to bus 402, to which bus is also connected memory 403, nonvolatile memory 404, display 407, input/output (I/O) unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to a main alternating current (AC) supply 406. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
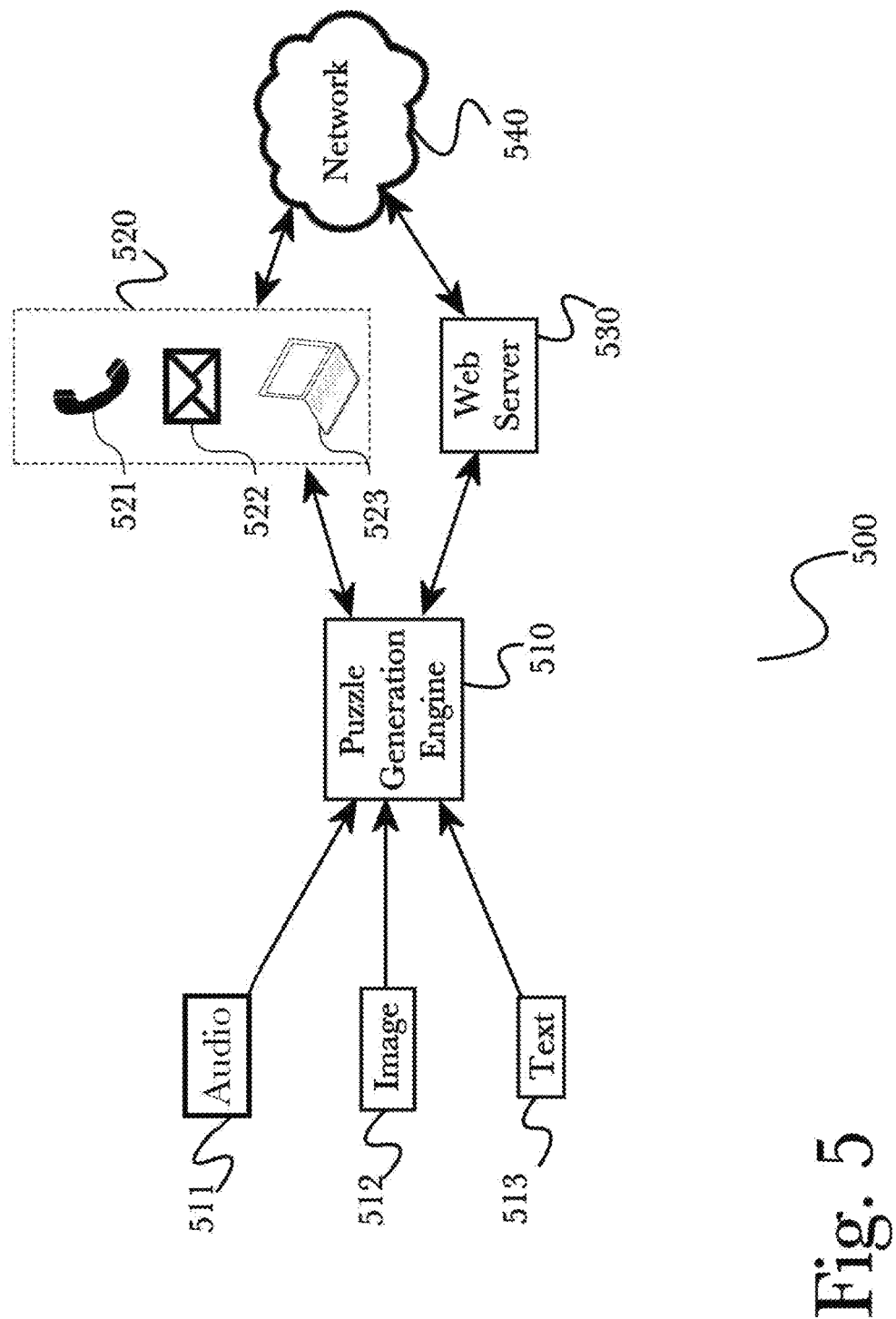
FIG. 5 is a block diagram of an exemplary system architecture for operating an electronic multimedia puzzle, according to a preferred embodiment of the invention.

FIG. 5 is a block diagram of an exemplary system architecture 500 for operating an electronic multimedia puzzle, according to a preferred embodiment of the invention. According to the embodiment, a puzzle generation (or training problem generation) engine 510 may operate on a computing device such as a personal computer, smartphone, tablet computing device, or a server computer, and may produce multimedia puzzles for use in games or other electronic content. Puzzles or content incorporating them may be presented to a user for interaction via a user device 520, such as using a software application operating on a smartphone 521, or via a web-accessible interface operating on a web server 530 that may be accessed via a network 540 using a web browser on a personal computer 523, or via email 522 (for example, if a user wishes to receive a "daily puzzle" in their email inbox or for users to work on puzzles via email in a manner similar to playing email chess). Puzzle generation engine 510 may receive audio clips 511, video or still image such as: photograph, or graphic design 512, or text 513 content, generally from a database or storage device, or optionally they may be received "live" such as audio recorded by a microphone, photos taken with a camera, or text entered by a user via a user device 520. For example, a user may take a photo on their device and select it for use in puzzle generation, to create a customized puzzle using a photo of personal significance such as for sending to a friend. Additionally, various repositories of media content may be utilized for greater variety, such as selecting portions of text from online articles or books, photographs or videos from a user's online profiles or profiles of their contacts, or from publicly-available content from SOUNDCLOUD™ or YOUTUBE™. To avoid copyright issues with content providers, only public-domain content may be used, or a user may be able to provide their account information with various content hosting services to enable the use of additional content to which they have appropriate usage rights. This may also be used to add additional uses to puzzles, such as educational content for use in schools or for children's entertainment. Additionally, by allowing a user to select types of content or from where the content is selected, a user may be allowed to tailor the nature or difficulty of their puzzles to suit their preference (for example, a user may wish to produce puzzles using nature photography, or using songs from an artist they enjoy for which they have demonstrated usage rights).

According to the embodiment, a puzzle produced by a puzzle generation engine 510 may comprise a plurality of visual "tiles" or other discrete visual portions that may be shuffled or arranged. A user may then be prompted to rearrange the tiles to complete the puzzle, in a manner similar to a jigsaw puzzle or Rubik's Cube. Received clips of audio, video, or text content may then be divided into segments and each segment associated with a visual tile of the puzzle, resulting in each puzzle tile having a plurality of associated multimedia content. Generally, a 1:1 correspondence between multimedia segments and tiles is ideal, such that each tile has exactly 1 segment of a media type associated with it, and each media segment is associated with exactly 1 tile. However, it is possible to assign varying numbers of tiles and media segments, for example a puzzle that has 9 tiles and uses 5 audio segments, 2 text segments, and 2 image segments, or a puzzle where some tiles use more than one audio segment (for example, tiles having a longer-than-usual audio component), or other arrangements. Additionally, some media types may be omitted entirely to increase difficulty of a puzzle, for example a puzzle where the tiles have no visual component and are associated only with audio content, wherein simply looking at the puzzle gives no indication of completion or arrangement and audio segments must be listened to in order to understand the relation between tiles.

To configure the design or complexity of a particular puzzle, varying arrangements of media may be used such as associating each tile with one segment each of audio, photographic, and text-based content (for example, to produce an easier puzzle wherein the user may refer to whichever media type they prefer), or by varying the correspondence between portions of media. For example, in a "simple" puzzle, an audio clip may be split into equal segments and each audio segment associated with a tile. Then, a photograph may be divided into segments, and each segment associated with a tile based on the order of the audio segment already associated with that tile (that is, if a tile was associated with the first segment of audio, it is associated with the first photograph segment, and so on). In this manner, a user may determine a relative ordering of tiles based on recognition of an audio sequence or image segment, and may use that determination to orient the remaining tiles to complete the puzzle. For a more challenging puzzle, some of the tiles may have one of their media types, in this example, either the audio or image segments, obfuscated, forcing the solver to use the other media type. As an example, a puzzle may have a certain number of image segments on its tiles "scrambled" so that they are then of little or no assistance in solving the puzzle visually, forcing the solver to rely on the associated audio segments found on the same tiles to progress in completing the puzzle. Puzzles might then have only image media obfuscated; they might, only have audio media obfuscated; or they might have a subset of tiles where image data is obfuscated and another, mutually exclusive subset where audio data is obfuscated. As puzzle pieces with obfuscations are correctly placed, the obfuscations would be removed to reveal the original form.

Media content that may be used in the generation of a puzzle may vary widely, for example using segments of songs that a user may recognize to aid them in rearranging the puzzle to complete the song, or using a familiar photograph that they may arrange similar to a jigsaw puzzle. For more challenging puzzles, some or all of the media used may be unrecognizable, such as randomized text, portions of static or meaningless noise for audio, or abstract photographic content. Additionally, video content may be utilized that changes over time, for example taking a scene from a film and dividing it into segments based on visual portions of a scene, and then looping several seconds of the video content continuously. This would require a user to rearrange the tiles to complete the scene, but it would be difficult to determine their relationship to each other as the scene is changing constantly while they are solving the puzzle. For even greater difficulty, the portions may be played at disparate time offsets (for example, one tile may show the scene from 0:01-0:05, another tile starting from 0:05-0:09, and a third tile from 0:12-0:18, and so on), so that at any given moment the visible content would seem disjointed as it does not assemble a complete video frame, and upon puzzle completion the time offset may be removed so that the video is restored (or optionally, when two tiles are arranged correctly, any time offset is removed so that a user has visual confirmation of the correct tile placement and as they complete the puzzle they may begin to understand the video frame overall, making subsequent tiles easier to orient). Similarly, audio segments used may be played with added difficulty, such as varying the pitch or speed or introducing overlap between some segments, and then optionally removing these factors as the user completes the puzzle to confirm correct placement of tiles. Additional exemplary difficulty factors that may be added to media of any content may include reversing the direction of content (such as mirror-image text or playing audio or video backwards), inverting content (such as displaying a negative image on some tiles), rotating visual content, adding distortion or noise to content (such as overlaying a blur filter to a photograph segment or video segment or manipulating the brightness, contrast, or color values, adding a layer of static to an audio segment, or using a difficult-to-read font for text content such as one that is visually complex or introducing indistinct characters or symbols), linguistic translation (such as using an alternate language audio segment, or translating segments of text into different languages), or other methods of obfuscating content to increase difficulty. Additionally, media types may vary over time, for example if a user is taking a long time to solve a puzzle difficulty factors may be gradually removed, or additional media added to aid the user. For example, a puzzle may begin with no visual content and only audio media (as in a previous example). However, as time progresses, photograph segments may be revealed on some or all of the puzzle tiles, to aid the user.

It will be noted that there are may be several types of video puzzles provided, according to various embodiments of the invention. For example, where frames are divided into segments, all tiles would play at the same time and the video would show coherently across tiles when solved. Where the video has been segmented in time, tile 1 could play its segment and then stop; tile 2 could then play its segment and then stop, and so forth. For this second type, there could also be a separate part of the display that shows the content of each tile as it plays to give a continuous viewing in one place. Moreover, tiles could play in random order to increase puzzle difficulty. It will be appreciated by one having ordinary skill in the art that these various display and playback approaches are exemplary, and that many other possibilities exist consistent with the invention.

In some arrangements, a user may be rewarded for solving puzzles, for example based on number of completed puzzles, time to completion, or number of moves (that is, number of times any tile was rearranged) to complete, or other such performance metrics. Rewards may optionally come in the form of unlocking new content such as additional photographs or audio clips for use in puzzles, or a point-based system wherein a user may collect and accrue reward points that may then be used in various ways as a virtual currency. For example, users may exchange their points to unlock additional puzzle types or media content, to create custom puzzles using their own media or other configuration, to send puzzles to contacts, or optionally they may be exchanged with a third-party service such as to exchange puzzle points for other in-game currencies or for actual currency. For example, advertisers may present puzzles to users in an advertisement, and if a user completes the puzzle they may be rewarded with a discount on the advertised product or service, or users may collect points and exchange them for various virtual currencies used by online vendors or marketplaces, such as credit with AMAZON™ or EBAY BUCKS™. Rewards may be used to encourage user participation and sharing, both by rewarding users for sharing puzzles or by allowing users to spend points to share puzzles or to unlock specific content for sharing. For example, a user may be encouraged to complete puzzles to unlock the ability to upload their own photographs for use in puzzles, and then they may be rewarded for sharing puzzles created with that photograph, in turn offering additional incentive to unlock content in the first place. User may also optionally be allowed to trade points with other users, for example to give points to a friend to help them unlock content, or to collaborate on difficult puzzles by sharing the specific puzzle with a friend and both working on a solution, and then splitting the rewards.

DETAILED DESCRIPTION OF EXEMPLARY EMBODIMENTS

Figure 6:
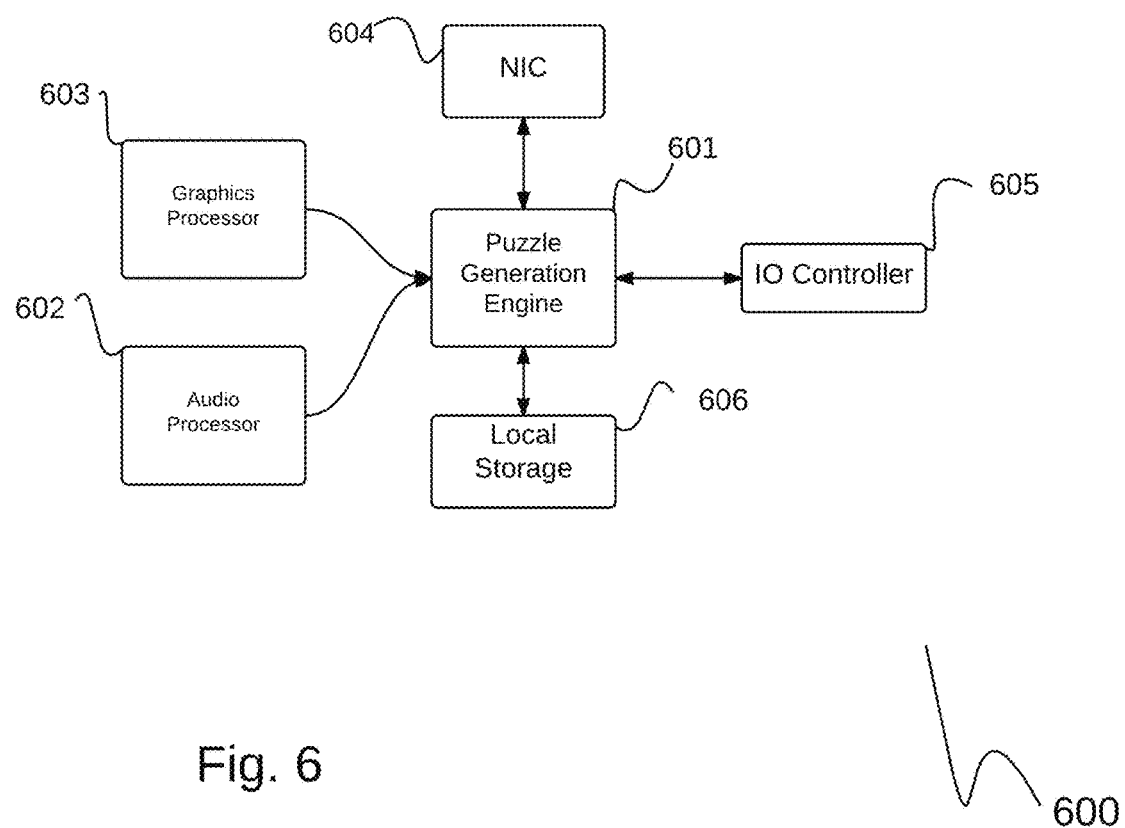
FIG. 6 is a system architecture diagram illustrating an exemplary system 600 for operating a puzzle generation engine on a user device.

FIG. 6 is a system architecture diagram illustrating an exemplary system 600 for operating a puzzle generation engine 601 on a user device, such as a smartphone or personal computer. According to the embodiment, a puzzle generation engine 601 may receive content for use in puzzle generation from a plurality of device subsystems, such as (for example) an audio processor 602 that may provide a plurality of audio content or may be used to apply manipulations to audio content (as described below, referring to FIG. 8) or a graphics processor 603 which may provide a plurality of image content, a network interface controller 604 that may be used to retrieve hosted content from an online provider such as YOUTUBE™, or a device's local storage 606 such as to utilize a user's music library or photos the user has stored on their device.

Figure 7:
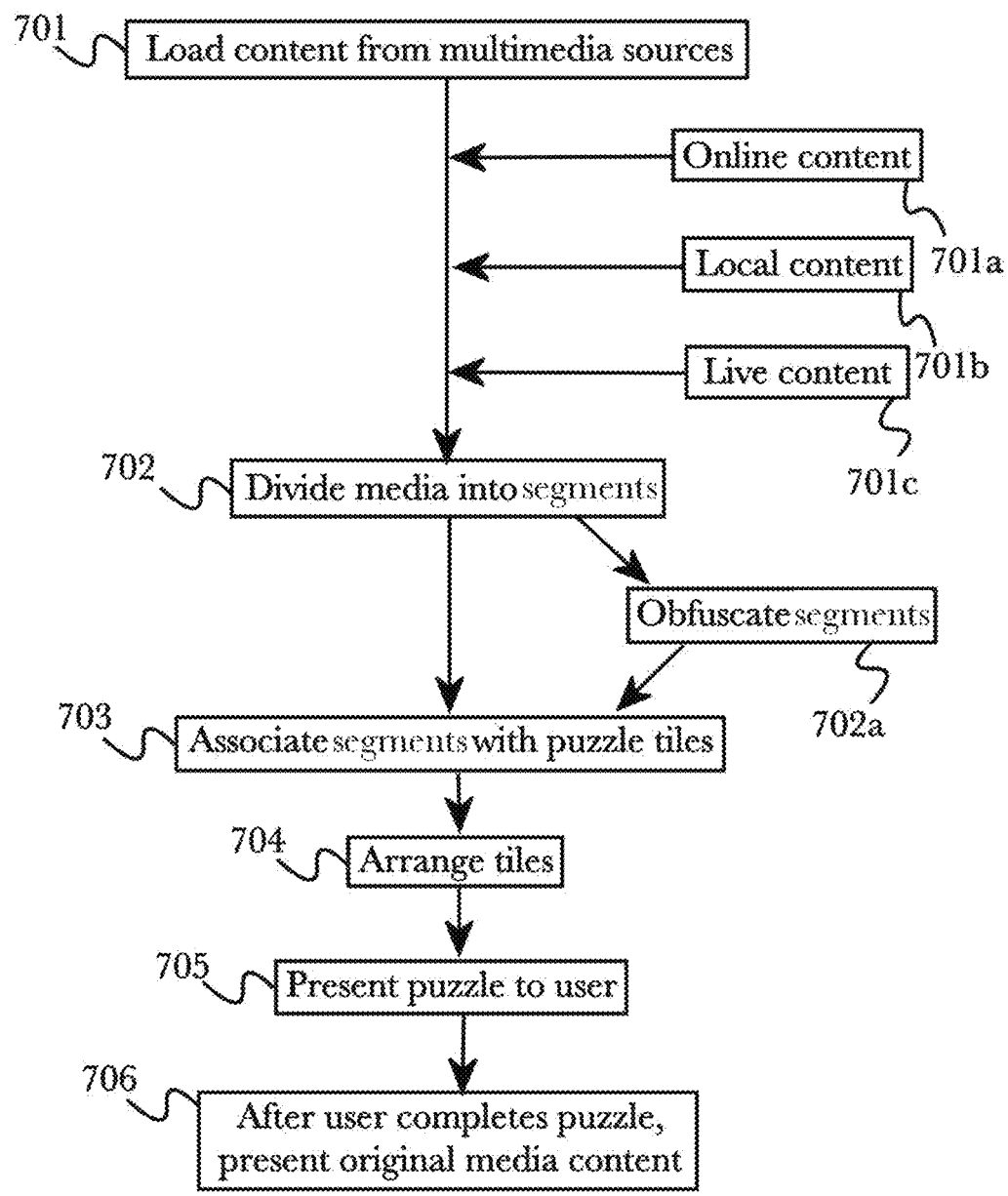
FIG. 7 is a flow diagram illustrating an exemplary method for operating an electronic multimedia puzzle, according to a preferred embodiment of the invention.

FIG. 7 is a flow diagram illustrating an exemplary method 700 for operating an electronic multimedia puzzle, according to a preferred embodiment of the invention. In an initial step 701, media content such as audio, photographic, video, or text-based content may be loaded for use in puzzle generation. Content may optionally be loaded from online content sources 701a such as YOUTUBE™ or SOUND-CLOUD™, local storage 701b such as a storage operating on a user's device (for example, songs and photos on a smartphone), or may be loaded live 701c such as using text entered by a user or video taken specifically for use in puzzle generation. For example, in a puzzle interface a user may be presented with options to select content sources, including "take photo", "enter custom text" or "record sound", to load live content for use.

In a next step 702, loaded media content may be divided into segments for use, for example dividing audio by time segment or dividing regions of a graphic, photograph or video clip, or dividing a length of text into smaller segments. Optionally, some or all of the resulting segments may be obfuscated 702a to some degree, for example by translating text, rotating images, or applying distortion or filters to audio or video content. In a next step 703, segments may be associated with puzzle tiles, optionally in varying arrangements to modify the difficulty of a puzzle. For example, to make a puzzle easier for a user to solve, each puzzle tile may be associated with exactly one segment of each media type, and segments may be associated in a similar order (that is, a puzzle tile with the first audio segment is also associated with the first photo or text segment, and so on), or for a more difficult puzzle segments may be associated more arbitrarily or in different arrangements such as associating text and audio with some tiles while only associating audio with others, or by selectively displaying some media portions and not displaying others, for example playing segments 1-3 of audio when tiles 1, 2 or 3 are activated but not displaying the corresponding segments of text on those tiles, then displaying segments 4-6 of text on tiles 4-6 but not playing the corresponding audio segments (4-6), resulting in a "half audio, half text" puzzle.

In a next step 704, puzzle tiles may be arranged to produce an "initial state" for the puzzle, generally in an arbitrary manner to make the initial puzzle tiles difficult for a user to quickly identify and orient. This shuffled puzzle may then be presented to a user for solving in a next step 705, and in an optional end step 706 a user may be presented with the original, unmodified media content used upon successfully solving the puzzle.

Figure 8:
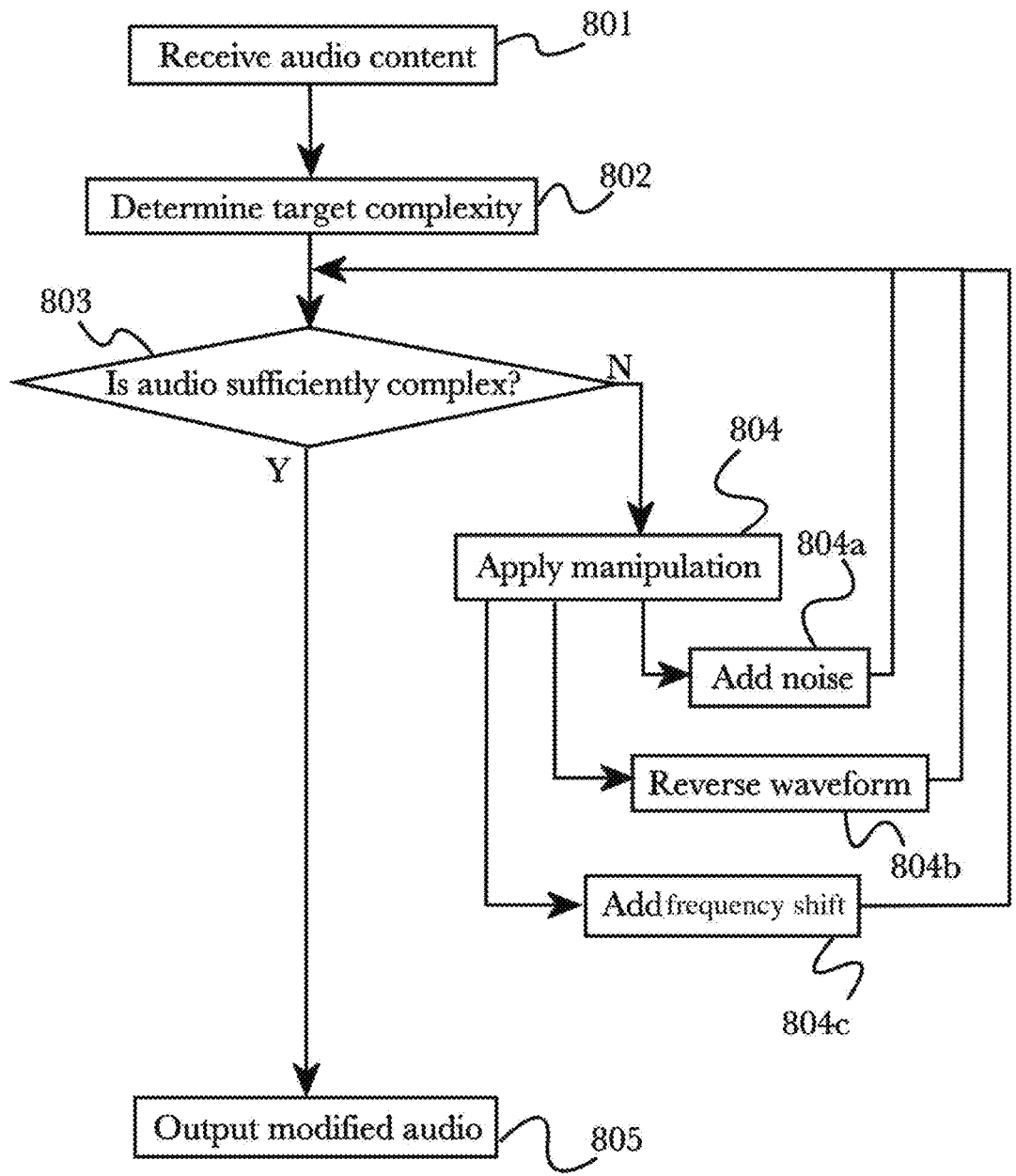
FIG. 8 is a method diagram illustrating an exemplary process for manipulating audio content to vary the complexity of a puzzle.
Figure 8:

FIG. 8 is a method diagram illustrating an exemplary process 800 for manipulating audio content to vary the complexity of a puzzle. In an initial step 801, a puzzle generation engine may receive a plurality of audio content, such as by loading music, which may or may not have been trimmed or specifically selected by the user to insure incorporation of certain desired clips, from a user's library or by recording audio from a microphone. In a next step 802, puzzle generation engine may determine a target complexity for a new puzzle, for example to produce a puzzle of sufficient complexity to provide a challenge for a user (for example, selecting a higher complexity for a user that has completed many puzzles). In a next step 803, the audio content may be checked for sufficient complexity, for example by initially dividing the audio into segments for association with puzzle tiles, and then determining whether this alone is sufficient to reach a target complexity as previously determined. If the audio is not yet sufficiently complex, a number of manipulations may be applied in a next step 804 on either a segment-by-segment basis for maximal solution difficulty or on the entire clip prior to segmentation for more moderate increase in solution difficulty, such as including (but not limited to) adding noise to an audio recording 804*a* (such as by applying a layer of arbitrary noise or distorted audio from other content), reversing the audio waveform 804*b* which would therefore reverse the playback direction (making the audio sound backwards when a user listens), or applying a frequency shift 804*c* to cause the audio to be played with either higher or lower tonal qualities than the rest of the tiles in the puzzle or at a different playback rate. After applying one or more manipulations, the newly-modified audio may be checked for complexity 803 in a looping operation, until such time as the audio is determined to be sufficient for a target complexity rating, at which point the modified audio content may be output for use in a puzzle 805. As the user solves the audio puzzle, transformations will be removed from the correctly placed tiles to reveal the corresponding original content which has been stored prior to tile complexity addition.

Figure 9:
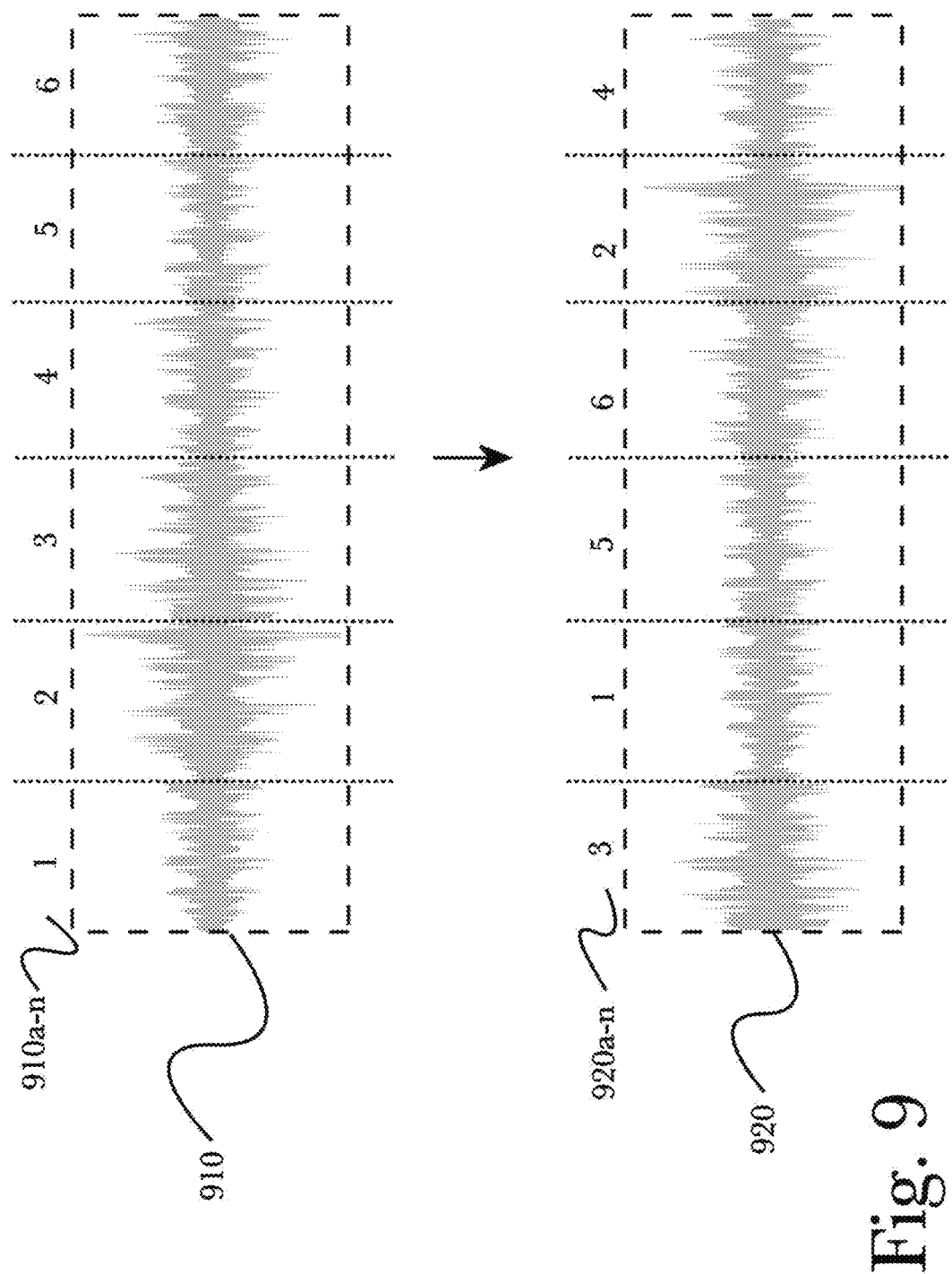
FIG. 9 is an illustration of an exemplary audio puzzle, showing the use of rearranged segments of an audio waveform.

FIG. 9 is an illustration of an exemplary audio puzzle, showing the use of rearranged segments of an audio waveform. According to the embodiment, an initial audio waveform 910 may be received by a puzzle generation engine for use in a puzzle, and may initially be divided into a number of segments 910*a-n* for association with puzzle tiles. These portions 910*a-n* may be rearranged to produce a number of shuffled segments 920*a-n*, resulting in a shuffled waveform 920 that may be indecipherable to a user upon listening, requiring them to rearrange the segments to restore the waveform and complete the puzzle.

Figure 10:
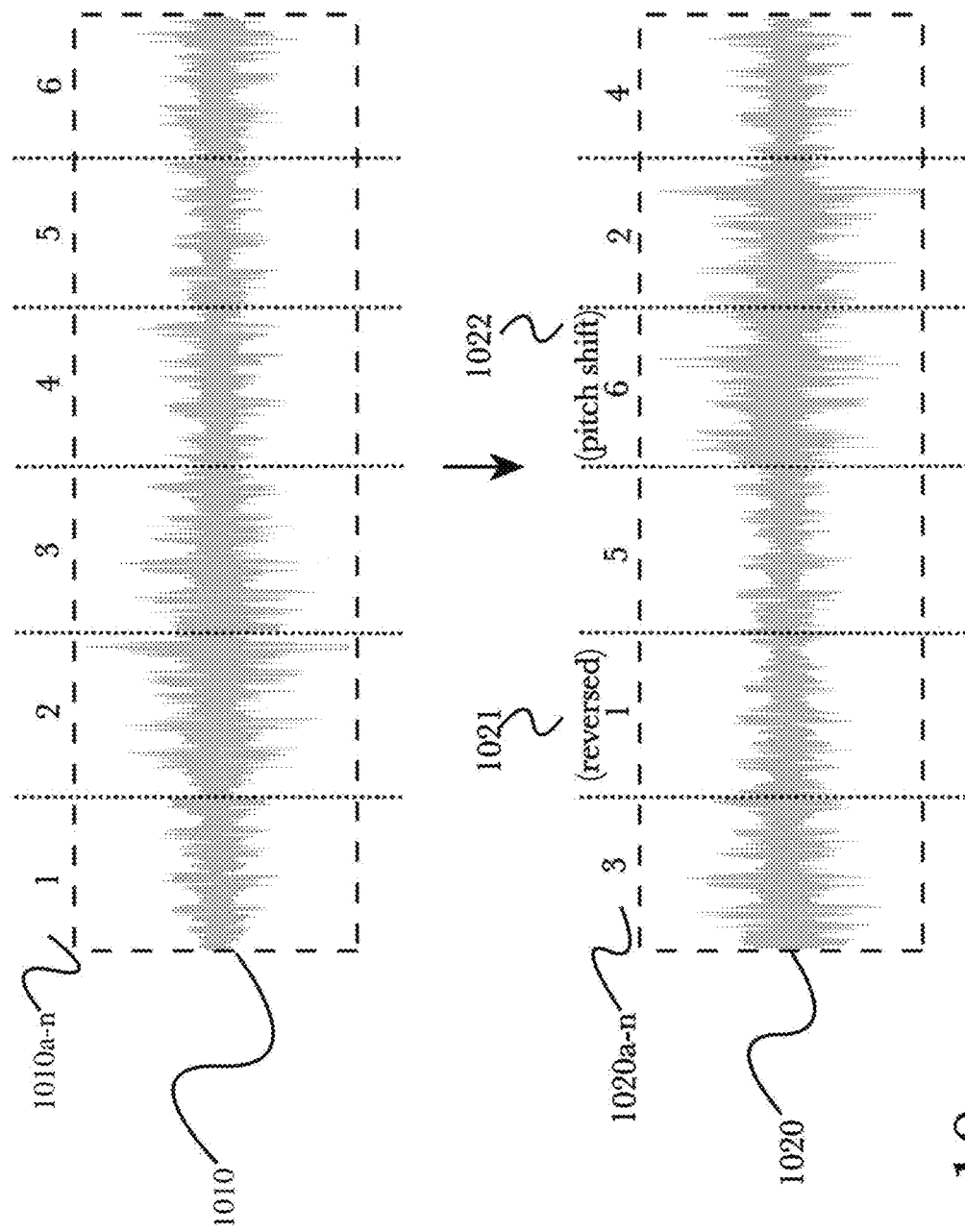
FIG. 10 is an illustration of an exemplary audio puzzle, showing the use of rearranged and manipulated segments of an audio waveform.

FIG. 10 is an illustration of an exemplary audio puzzle, showing the use of rearranged and manipulated segments of an audio waveform. According to the embodiment, an initial audio waveform 1010 may be received by a puzzle generation engine for use in a puzzle, and may initially be divided into a number of segments 1010*a-n* for association with puzzle tiles. These segments 1010*a-n* may be rearranged to produce a number of shuffled segments 1020*a-n*, resulting in a shuffled waveform 1020 that may be indecipherable to a user upon listening, requiring them to rearrange the segments to restore the waveform and complete the puzzle. Additionally, some or all of the segments may be manipulated to increase the complexity of a puzzle using the modified waveform 1020, for example by reversing a segment 1021 or altering the pitch of a segment 1022, or other manipulations to further distort or modify audio.

Figure 11:
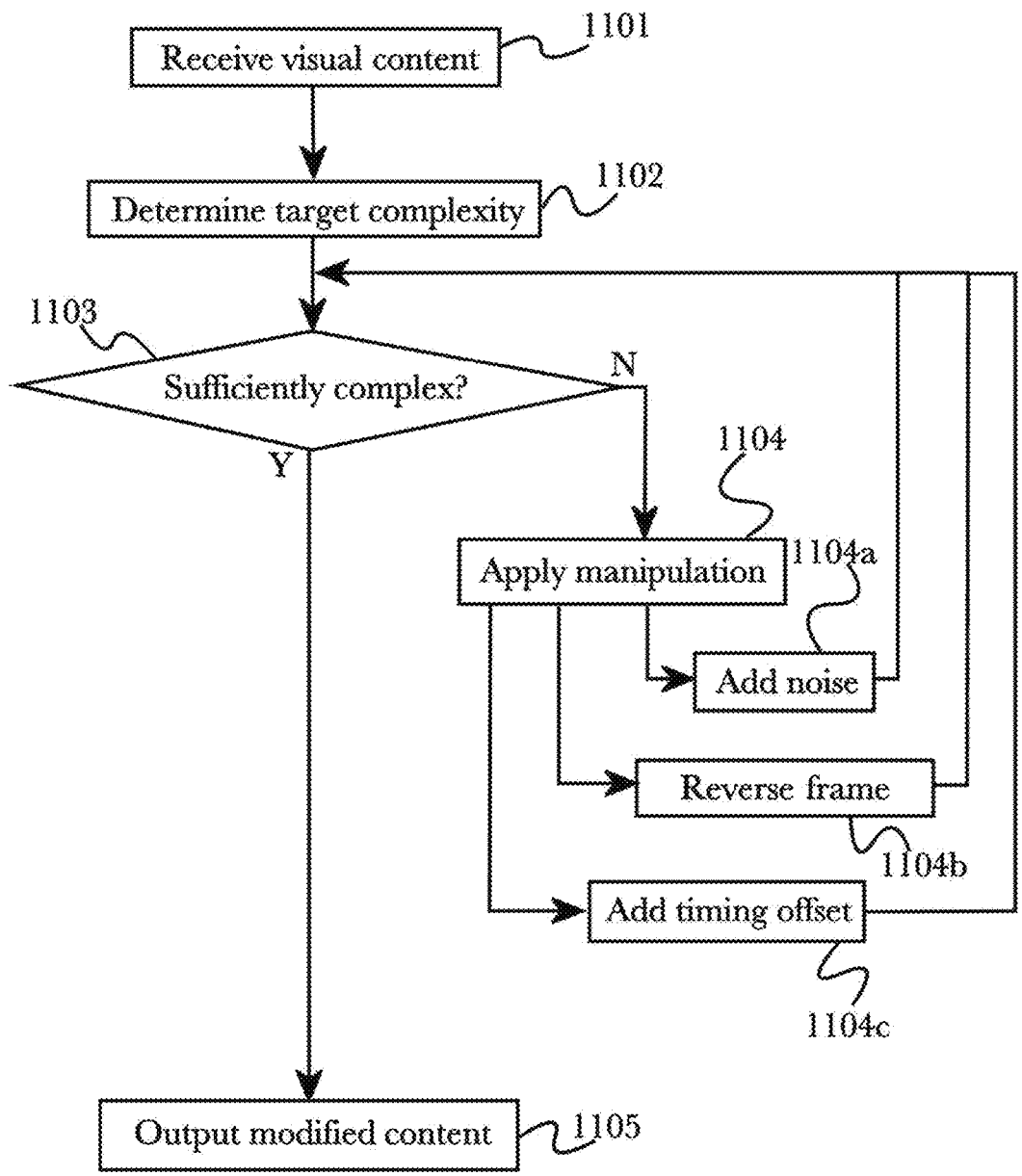
FIG. 11 is a method diagram illustrating an exemplary process for manipulating photographic or video content to vary the complexity of a puzzle.

FIG. 11 is a method diagram illustrating an exemplary process for manipulating still image or video content to vary the complexity of a puzzle. In an initial step 1101, a puzzle generation engine may receive a plurality of photographic or video content, such as by loading photos from a user's library, which may or may not have been trimmed or specifically selected by the user to insure incorporation of certain desired regions of a photo or specific clips, if video, or by recording video from a camera operating on a user's device (for example, a video camera built into a user's smartphone). In a next step 1102, puzzle generation engine may determine a target complexity for a new puzzle, for example to produce a puzzle of sufficient complexity to provide a challenge for a user (for example, selecting a higher complexity for a user that has completed many puzzles). In a next step 1103, the content may be checked for sufficient complexity, for example by initially dividing a video into segments for association with puzzle tiles, and then determining whether this alone is sufficient to reach a target complexity as previously determined. If the content is not yet sufficiently complex, a number of manipulations may be applied in a next step 1104, such as including (but not limited to) adding noise to a recording 1104*a* (such as by applying a layer of arbitrary noise, false coloration, or distorted imagery from other content), reversing an image frame 1104*b* which would flip or mirror an image, or applying timing offsets 1104*c* to cause video fragments of some tiles to be played out of sync with content on other tiles, or certain tiles played at different playback frame rates than other tiles. After applying one or more manipulations, the newly modified content may be checked for complexity 1103 in a looping operation, until such time as the content is determined to be sufficient for a target complexity rating, at which point the modified content may be output for use in a puzzle 1105. As the user solves the visual puzzle, transformations will be removed from the correctly placed tiles to reveal the corresponding original content, which has been solved prior to tile complexity addition.

Figure 12:
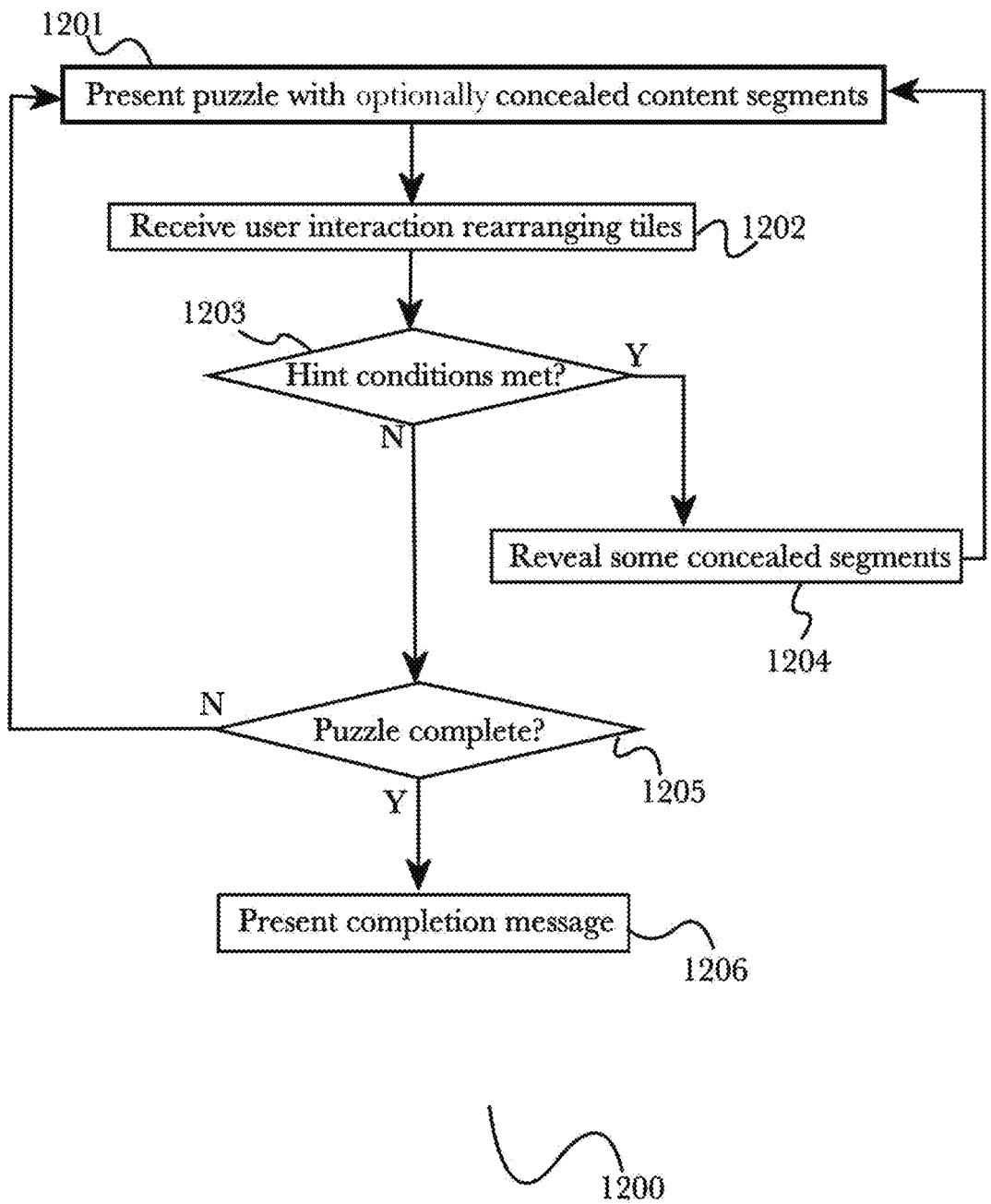
FIG. 12 is a method diagram illustrating an exemplary process for gradually revealing portions of content as a user interacts with a puzzle.

FIG. 12 is a method diagram illustrating an exemplary process 1200 for gradually revealing segments of content as a user interacts with a puzzle. In an initial step 1201, a puzzle with a plurality of concealed content segments may be presented to a user for interaction. In a next step 1202, a user's interaction may be received, and a rearranged configuration of puzzle tiles based on the user's interaction may be checked to determine if it meets requisite conditions for a "hint" 1203. Hints may vary in nature according to the puzzle or a user's preference, and according to the embodiment a hint may involve revealing one or more concealed content portions. If a user's interaction qualifies for a hint (for example, if they have reached a certain number of tile moves without placing any tiles in the correct location), a number of concealed content segments may be revealed in a next step 1204, giving the user additional content with which to make a determination of tile arrangement. For example, a user may have more segments of audio to listen to, which may indicate the overall audio clip content and assist them in positioning tiles, or more portions of a partially-concealed image may be revealed, assisting a user in identifying the overall image content. If a user's interaction does not qualify for a hint, the puzzle may be checked for completion in a next step 1205. If the puzzle is not complete, operation may continue by looping back to step 1201 and presenting the puzzle to the user for further interaction (and optionally, if needed, further hints). If the puzzle is complete, the user may be presented with a completion message 1206, for example a message of congratulations, information on sources from which to obtain additional puzzles, a slideshow of images or audio clips similar to the puzzle just solved, puzzle scoring or rewards earned, or several variants of the original media content that was used in the creation of the puzzle such as possibly an entire stanza of the song from which a just solved audio clip was taken, possibly the scene from which a just solved video clip was taken, possibly interesting trivia about the just solved media, or possibly the entire text passage from which a just solved text puzzle was derived, although this is just one of many possible programmed outcomes. Interestingly, there are also various completion possibilities linked directly to the puzzle material. For example, an image based puzzle could use a frame of a video clip. On solving the puzzle, the video clip could then be played. Alternatively, at the end of an image-based puzzle, a slide show of different images could be played, rather than just showing the solved image. In a further alternative, the puzzle could use part of an audio clip and, on completion, the whole audio clip could be played. Equally, the puzzle could use part of a text piece and, upon completion, the whole piece could be shown. This feature could be quite important for purposes of education and training and could also be relevant in the advertising domain.

Figure 13:
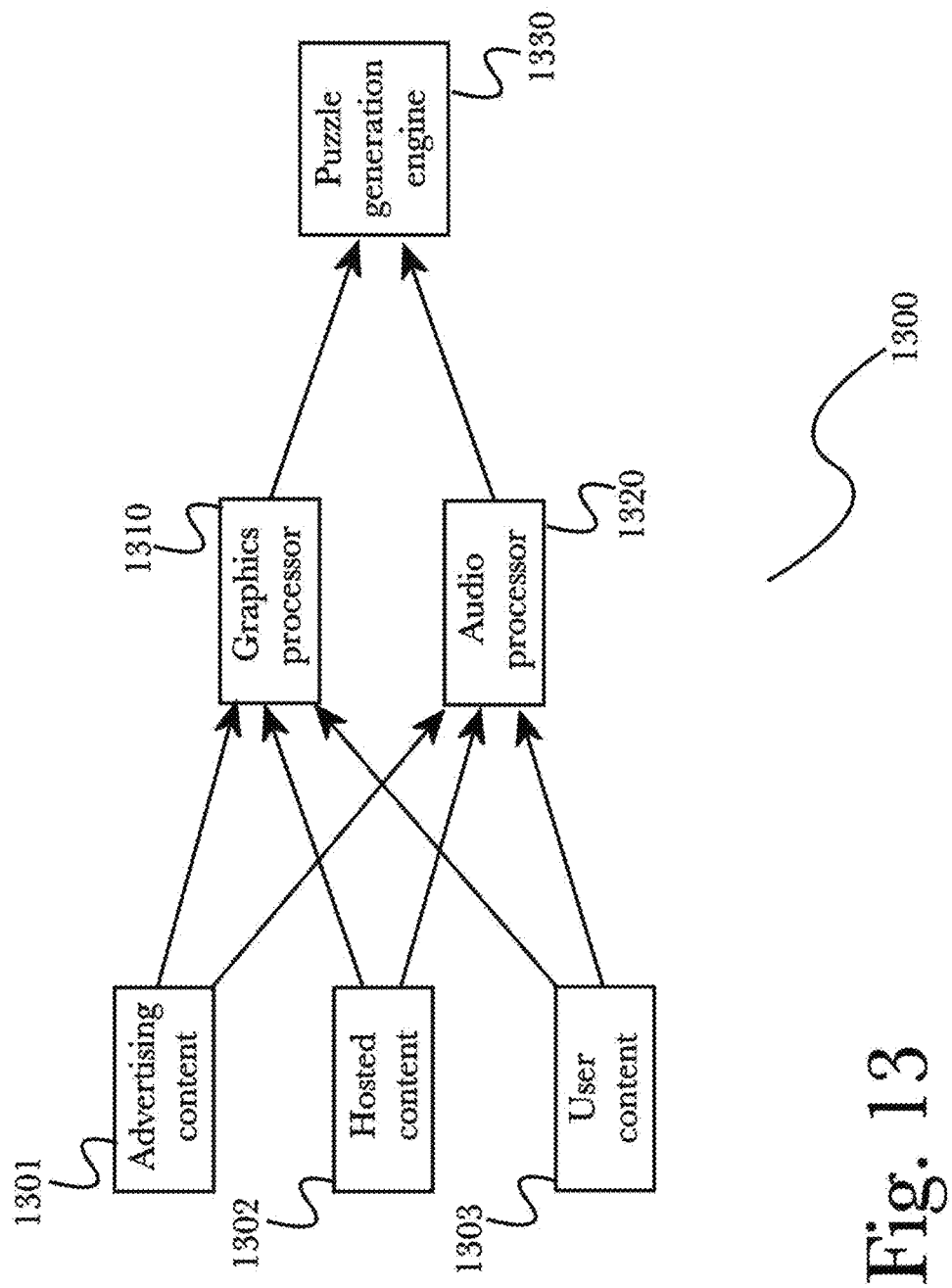
FIG. 13 is a diagram illustrating the use of a puzzle generation engine utilizing content from a variety of sources.

FIG. 13 is a diagram illustrating the use of a puzzle generation engine utilizing content from a variety of sources. According to the embodiment, a plurality of content may be loaded from different sources, optionally in various combinations to arrive at a mixed-content puzzle (for example, to increase complexity by using different media types, or similar appearance (for image content) or auditory structure (for music clips) from different sources, or both). Advertising content 1301 may be used to incorporate text, images, audio, or visual content from advertisements, for example for a vendor to produce and provide puzzles using their own advertising content to promote a product through user engagement. Hosted content 1302 such as video content hosted on an online provider such as YOUTUBE™ or audio from a hosting service such as PANDORA™, may be used to produce puzzles with a wide variety of content such as by incorporating a user's online content stores or publicly-available content from various providers. User content 1303 may be used to incorporate content from a user's personal media, such as photos stored on their device or audio from their local music library, or other locally available (that is, stored on a user's device and not in an online storage) media content. According to the nature of retrieved content, it may be processed by a graphics processor 1310 or an audio processor 1320, for example to divide content into portions for association with puzzle tiles, or to apply manipulations to content to increase the complexity of a puzzle. Processed content may then be provided to a puzzle generation engine 1330 for use in producing and presenting a puzzle to a user.

Figure 14:
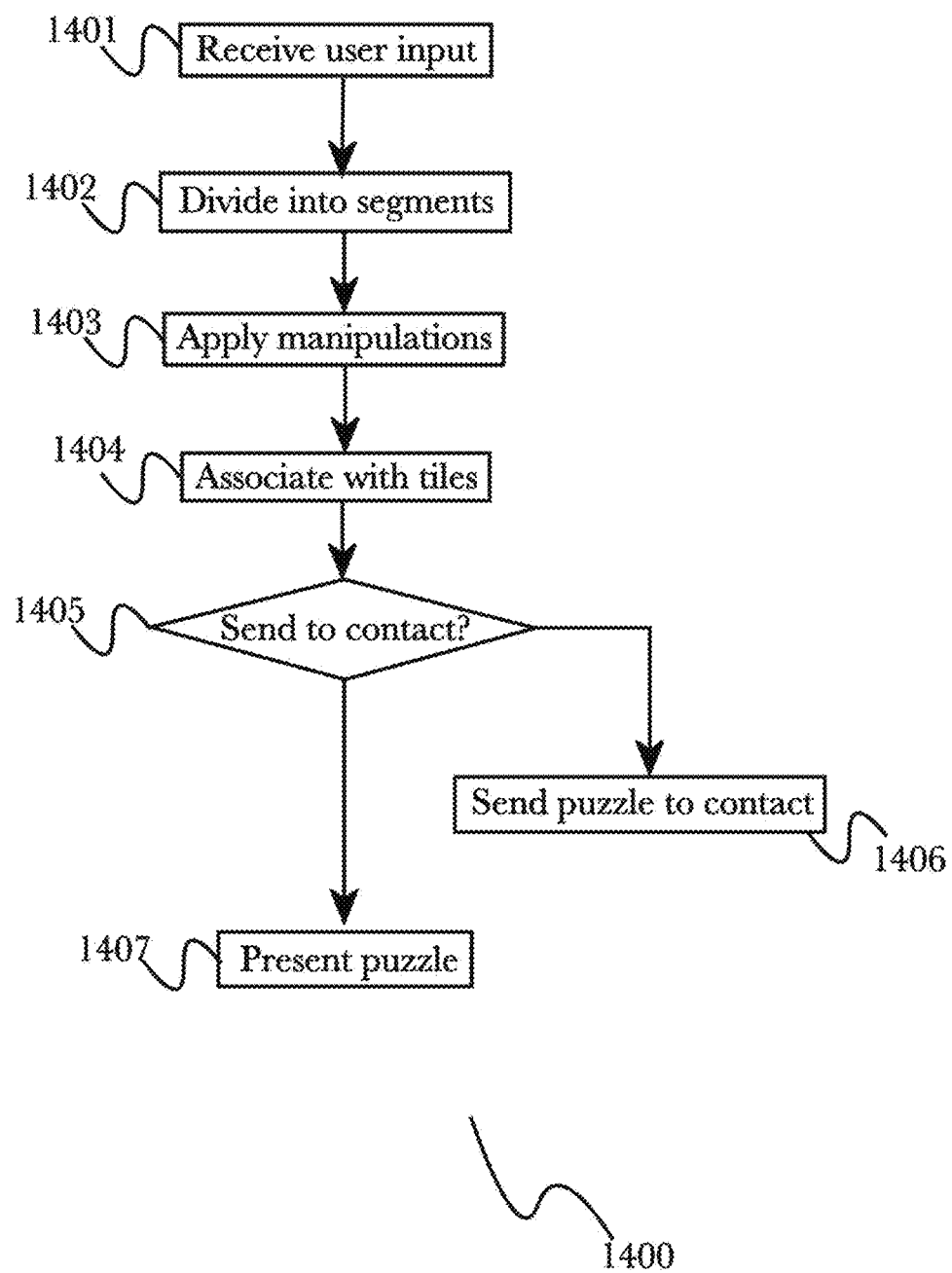
FIG. 14 is a method diagram illustrating an exemplary process for producing and optionally sharing a user-created puzzle.

FIG. 14 is a method diagram illustrating an exemplary process for producing and optionally sharing a user-created puzzle. In an initial step 1401, a puzzle generation system may receive a plurality of user input, for example text typed or audio recorded by a user. This input may be used as content for puzzle generation, to produce a custom user-created puzzle. In a next step 1402, content from user input may be divided into segments for association with puzzle tiles, and in a next step 1403 any optional manipulations may be applied to increase complexity of a user-generated puzzle. In a next step 1404, content segments may be associated with puzzle tiles to produce a puzzle, and the user may then be prompted 1405 to optionally send the puzzle to a contact (or optionally to someone who is not currently a contact, for example by manually entering a phone number or email address). If the user chooses to send the puzzle, it may be sent in a message 1406 to share the puzzle between users, and if the user chooses not to send the puzzle it may be presented for interaction 1407, for example so a user may generate puzzles using their own content rather than "stock" or publicly-available content. Optionally, a puzzle may be both sent and presented to a user (that is, a prompt for sharing may use a checkbox or other optional selection without being an exclusive either/or choice), so that they may solve the puzzle while also sharing it with others.

Figure 15:
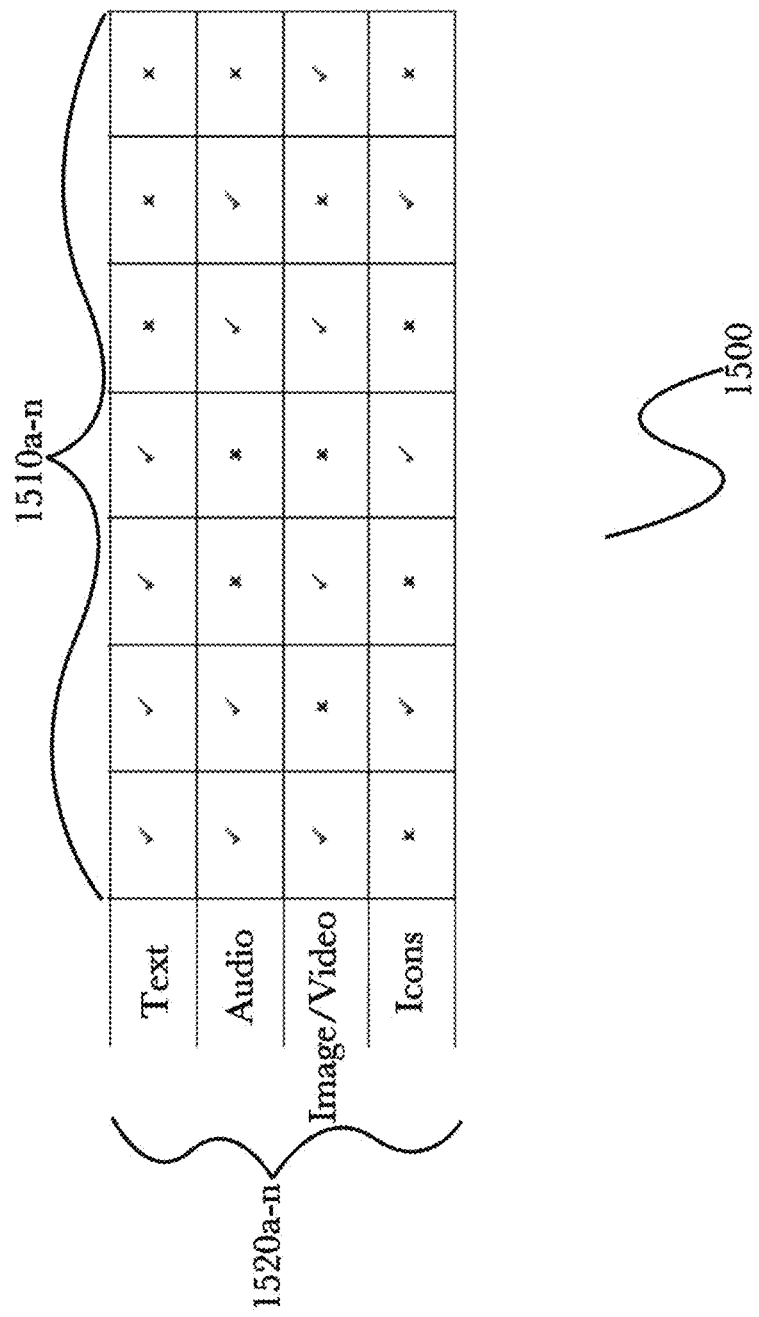
FIG. 15 is an illustration of a variety of exemplary combinations of different content types to create puzzles.

FIG. 15 is an illustration of a variety of exemplary combinations of different content types to create puzzles. As illustrated, a variety of content types 1520*a-n* such as text, audio, images, video, or icons, may be combined in different ways to produce puzzles of varying complexity or puzzles configured for specific devices (for example, puzzles intended for interaction on devices without a screen may be produced without the use of video content). A variety of exemplary combinations 1510*a-n* are shown, for example for creation of a puzzle using text, audio, and icons (for example, program icons from a user's device, or stock icons such as common shapes or symbols), but not using photo or video content. Generally, icons and photo or video content may be considered similar in nature and exclusive in puzzle generation. However, for various puzzle configurations, it may be desirable to use both photo content and icons, or optionally photo and video content (producing a puzzle with a number of visual content sources, some of which is stationary and some of which is animated). These different combinations may be used to produce a wide variety of puzzles of varying degrees of difficulty, and using content of various types to accommodate different devices or content sources. For example, if one content source is unavailable (for example, if a removable drive cannot be located or if a hosted provider is offline), different content may be utilized to produce a puzzle according to a different content combination.

Figure 16:
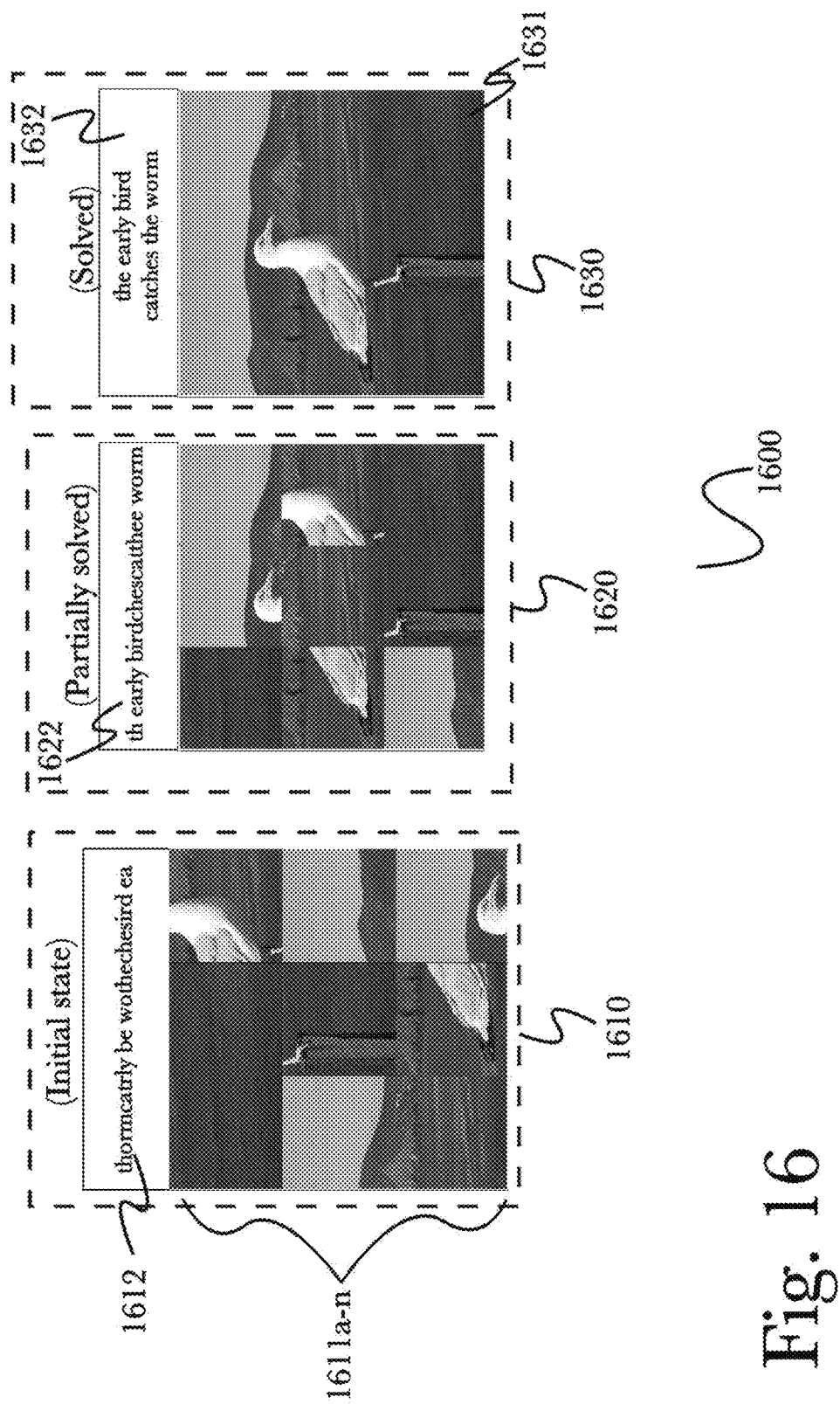
FIG. 16 is an illustration of an exemplary user interface for an electronic multimedia puzzle, illustrating several stages of puzzle completion.

FIG. 16 is an illustration of an exemplary user interface 1600 for an electronic multimedia puzzle, illustrating several stages of completion. According to the embodiment, when a puzzle is presented to a user for solving, they may be shown a variety of utilized media types in a shuffled initial state 1610. For example, a phrase of shuffled text 1612 may be presented, along with a plurality of puzzle tiles 1611*a-n* each displaying a segment of an image. As a user completes the puzzle by arranging tiles 1611*a-n*, segments of text 1612 may be rearranged accordingly, such that the text phrase reflects the arrangement of tiles. For example, in the illustrated exemplary puzzle the text phrase "the early bird catches the worm" is used, and is initially displayed in a shuffled state. As tiles are arranged, segments of the text associated with each tile may then be arranged according to the relative tile arrangement, such that when two tiles are positioned next to each other in a partially solved state 1620, portions of the text 1622 may become legible as words or sentence fragments are completed. When the puzzle is fully solved 1630, the text phrase 1632 becomes fully readable and the image 1631 is completed. In this manner, text content may be used to aid a user by providing an overall indication of completeness or of tile position relative to other tiles, and according to the particular content used a user may choose to solve the puzzle using either text or visual content, or both. In puzzles incorporating audio clips, audio may be played when a user interacts with a tile, so that a user may additionally listen to audio portions and arrange tiles based on this audio information.

Solution of puzzles in the absence of interaction with others, either cooperative, or competitive is a very rewarding task for many and is often the first mode of puzzle solution called to mind when the subject is introduced for discussion. However, the ability to compare one's abilities to those of others in a given task, including solution of puzzles of differing types, has proven to be extremely exhilarating entertainment for a large portion of the population. A preferred embodiment of the invention, which is designed to run on several types of network attached devices, many of which can also communicate in an ad-hoc manner, would easily allow interactive puzzle solving of both a cooperative and competitive nature, depending on the desires of the participants. Some examples of competitive play that the invention might offer is: which competitor can solve a particular puzzle in the least amount of time and which competitor can solve a puzzle in the least moves. There are, of course other modes that might be available, these two examples represent only two of the simplest and are not meant to diminish the scope of modes envisioned for the invention. Further, as the invention can present puzzles of sound, puzzles incorporating images, both photographic and of graphic design and video, one could envision competition employing multiple puzzles using different media types. In fact, all permutations of the aforementioned media types would be possible under the design of the invention.

The subject of education, specifically ways to improve educational outcome for all students has been a perennial discussion for many years. Based on current conversation, any tool that can aid in the learning process should be tried. The design and capabilities of the invention make it a potentially potent educational tool in that it presents "puzzles" that can be used at all levels, from teaching numbers and the alphabet to teaching pathways of biochemistry, in a visually, auditory engaging format. For example, for an early learner, the letters of the alphabet could be spoken and the learner chooses the correct tile, giving auditory, visual and tactile reinforcement to the process. Later in education foreign language learners might hear key phrases and then need to synthesize or complete the phrase in text using letters or words available as puzzle tiles. The converse could also be used to reinforce difficult phonetic differences between languages. The students might also solve a puzzle containing an unknown key phrase and then hear it and its English meaning upon completion. Learners might be required to solve a practice math problem prior to receiving a fun image, audio or video puzzle to solve. Another possibility is for the learner to solve a puzzle that is a single word, or simple phrase that conveys information in itself and, upon solution, then be presented with further information about the subject the word or idea from the puzzle represents. This added information may be in text, multimedia form. One knowledgeable in the art will realize that these are only a very few examples of the potential for use of the invention in education and should not be used as limiting boundaries on that potential.

The skilled person will be aware of a range of possible modifications of the various embodiments described above. Accordingly, the present invention is defined by the claims and their equivalents.

What is claimed is:

1. A system for operating an interactive electronic multimedia puzzle, comprising:
 a puzzle generation engine comprising at least a plurality of programming instructions stored in a memory and operating on a processor of a computing device and configured to:
  load a plurality of multimedia content from a plurality of content sources, the multimedia content comprising at least visual content, the visual content being drawn from one or more of the set of video, image, and text;
  divide at least a portion of the multimedia content into a plurality of segments;
  associate at least a portion of the plurality of content segments with at least a portion of a plurality of puzzle tiles;
  present at least a portion of the plurality of puzzle tiles for interaction by a human user;
  receive a plurality of user interaction; and
  direct a rearrangement of puzzle tiles for presentation to a user, the rearrangement being based at least in part on at least a portion of the user interaction;
 wherein, for each tile of at least a subset of the tiles, a visual portion of the multimedia content of the respective tile is obfuscated using a plurality of transformations that effectively reduce utility of each affected tile's obfuscated media for solving the puzzle.

2. The system of claim 1, wherein the plurality of content sources comprise at least a local storage operating on the computing device.

3. The system of claim 1, wherein the plurality of content sources comprise at least a hosted content provider accessible via a network.

4. The system of claim 1, wherein a user is prompted to provide multimedia content for use in puzzle generation.

5. The system of claim 1, wherein, successful solution of a multimedia puzzle leads to a plurality of possible items being displayed to the human user, one of which being a plurality of further information about the multimedia content used in the just-solved puzzle.

6. The system of claim 1 wherein at least a portion of the visual content comprises a plurality of graphic design content.

7. The system of claim 1 wherein at least a portion of the visual content comprises a plurality of photographic content.

8. The system of claim 1 wherein at least a portion of the visual content comprises video content which is then divided by visible image, by time offset within clip or both.

9. The system of claim 1, wherein at least a portion of the visual content comprises a body of text.

10. The system of claim 1, wherein at least a portion of the content segments are obfuscated using electronic processing.

11. The system of claim 1, wherein at least a portion of the obfuscated content segments are reverted to their original form based at least in part on user interaction.

12. The system of claim 1, wherein at least one tile from the plurality of puzzle tiles is associated with at least one of each of: an obfuscated audio content type, an obfuscated visual content type, and a non-obfuscated visual content type.

13. The system of claim 1, wherein at least one tile from the plurality of puzzle tiles comprises two or more partially-obfuscated visual content segments.

14. The system of claim 1, wherein at least one tile from the plurality of puzzle tiles comprises two or more partially-obfuscated multimedia content segments.

15. The system of claim 1, wherein the multimedia content further comprises audio content.

16. A method for operating an interactive electronic multimedia puzzle, comprising the steps of:
 loading, at a puzzle generation engine comprising at least a plurality of programming instructions stored in a memory and operating on a processor of a computing device and configured to load a plurality of multimedia content from a plurality of content sources, a plurality of multimedia content, the multimedia content comprising at least visual content, the visual content being drawn from one or more of the set of video, image, and text;

dividing at least a portion of the loaded content into a plurality of content segments;

associating at least a portion of the content segments with a plurality of puzzle tiles;

obfuscating, for each tile of at least a subset of the tiles, at least some of the visual content of the multimedia content of the respective tile using a plurality of transformations that effectively reduce utility of each affected tile's obfuscated media for solving the puzzle;

arranging at least a portion of the plurality of puzzle tiles; and presenting at least a portion of the arranged tiles to a human user.

17. The method of claim 16, further comprising the steps of:

receiving a plurality of interaction from the user;

rearranging at least a portion of the plurality of presented tiles based at least in part on at least a portion of the user interaction; and presenting the rearranged tiles to the user.

18. The method of claim 16, wherein at least one tile from the plurality of puzzle tiles comprises two or more partially-obfuscated visual content segments.

19. The method of claim 16, wherein at least one tile from the plurality of puzzle tiles comprises two or more partially-obfuscated multimedia content segments.

20. The method of claim 16, wherein the multimedia content further comprises audio content.

* * * * *